United States Patent Office 2,727,900
Patented Dec. 20, 1955

2,727,900

NEW CLASSES OF CYCLOPROPANES AND PROCESSES OF PREPARING THEM

Julius G. Shukys, Chatham Township, Morris County, Fernanda Misani Fiordalisi, East Orange, and Louise Speers Croix, Summit, N. J., assignors to Air Reduction Company, Incorporated, New York, N. Y., a corporation of New York No Drawing. Application February 16, 1953,
Serial No. 337,222

20 Claims. (Cl. 260—310)

This invention relates to organic compounds and has for its object the provision of a new class of fluorine substituted cyclopropane derivatives and a method of producing them. More particularly the invention provides trifluoromethylcyclopropanes which can be represented by the formula:

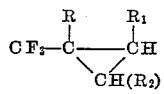

wherein R stands for hydrogen or a lower alkyl group, $R_1$ stands for a radical of the group consisting of hydrogen and trifluoromethyl, and $R_2$ stands for a radical of the group consisting of hydrogen and lower alkyl carbalkoxy group. The invention also embraces trifluoromethylcyclopropanes selected from the group consisting of trifluoromethylcyclopropane, 1-trifluoromethyl-1-lower alkyl-cyclopropane, 1-trifluoromethyl-1-lower alkyl-2(or 3)-carbalkoxycyclopropane, and 1,2-di(trifluoromethyl)cyclopropane. The compounds are useful as anesthetics and for other purposes.

In one embodiment of the method of the invention the novel cyclopropanes can be readily produced by reacting a trifluoromethyl-olefine with a diazomethane compound, such as diazomethane or diazoacetic acid alkyl ester. The reaction is preferably carried out in the presence of a solvent, such as ethyl ether. In the case of preparing trifluoromethylcyclopropanes of the above formula wherein R is hydrogen or lower alkyl and $R_1$ and $R_2$ are each hydrogen, the reaction with diazomethane is facilitated by irradiating the reactants with ultra-violet light. Compounds, wherein $R_2$ is carbalkoxy, readily form when the trifluoromethyl-olefine and the diazoacetic acid alkyl ester, are heated preferably above 100° C.

When the trifluoromethyl-olefine is reacted with diazoacetic acid alkyl ester, the corresponding 1-trifluoromethyl-2(or 3)-carbalkoxy cyclopropane appears to be formed directly. When the trifluoromethyl-olefine is reacted with diazoacetic acid alkyl ester, the corresponding 1-trifluoromethyl-2(or 3)-carbalkoxy cyclopropane appears to be formed directly. When the trifluoromethyl-olefine is reacted with diazomethane, a pyrazoline is first formed. The pyrazoline on heating, for example, in the presence of potassium hydroxide and platinized asbestos, readily decomposes with the formation of the corresponding trifluoromethylcyclopropane.

The following equation represents schematically the reactions involved when diazomethane is employed, R and $R_1$ having the same meaning as hereinabove assigned thereto:

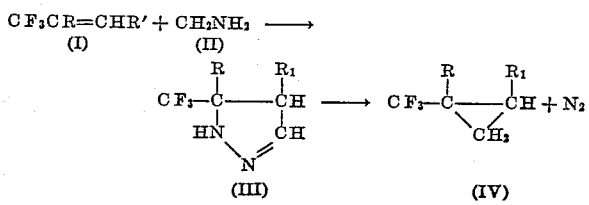

When the trifluoromethyl-olefine I is reacted with a diazoacetic acid lower alkyl ester, the corresponding pyrazoline III is apparently not formed, or if it is formed, appears immediately to decompose into the cyclopropane (IV) wherein one of the H's in the —$CH_2$— grouping is replaced by a carbalkoxy group. The pyrazolines corresponding to Formula III are also embraced within the scope of our invention.

As examples of trifluoromethyl-olefines, there can be employed trifluoropropylene, trifluoroisobutylene, 1,1,1,4,4,4-hexafluorobutene-2, and the like.

The following examples will serve to illustrate a method of the invention in producing the novel fluorine substituted cyclopropane derivatives.

Example 1

A solution of 20 g. of diazomethane in 750 ml. of anhydrous ether was placed in a 2-liter 3-neck flask. A thermometer, Dry-Ice and alcohol cooled condenser and a gas inlet tube were attached to the flask with rubber stoppers.

While the flask was cooled to 0.5° C., 48 g. of trifluoropropylene were bubbled in over a period of ½ hour. A quartz mercury arc lamp (model 11–983 Fisher Scientific Co.) was turned on the flask at the start of the reaction. When the addition of the trifluoropropylene was complete the ice bath was removed. At the end of two hours of irradiation with the ultra-violet light, the temperature reached 30° C. and the yellow color of diazomethane had disappeared. The ether was distilled off and the residue was fractionally distilled whereupon 5-trifluoromethyl-2-pyrazoline was obtained, B. P. 144–145° C.; $n_D^{20}=1.3870$.

In a 100 ml. round bottom flask were placed 41 g. of the 5-trifluoromethyl-2-pyrazoline and the flask was attached to a 6-inch long, 1-inch diameter column filled with an intimate mixture of 4 g. of 10% platinized asbestos and 2 g. of powdered potassium hydroxide. A thermometer was imbedded in the mixture to record the temperature. The outlet at the top of the column was connected to an air trap and a Dry-Ice-alcohol trap in series. The column was gradually heated to 220° C. whereupon the vapors of the boiling pyrazoline gradually reached the catalyst and decomposition occurred suddenly with the evolution of nitrogen. The decomposition of the pyrazoline was complete in about ½ hour. Some unreacted pyrazoline was carried through with the gases and was caught in the first trap. The Dry-Ice alcohol trap contained a pale yellow liquid which when distilled yielded trifluoromethylcyclopropane, B. P. 21.5–22.0° C., a colorless liquid.

Example 2

35 g. of trifluoroisobutylene were placed in a 3-neck flask provided with a Dry-Ice cooled condenser, thermometer and funnel. A solution of about 0.2 mole of diazomethane in 350 ml. of anhydrous ether was added. The mixture was irradiated with ultra-violet light, for 5–6 hours, using the quartz mercury arc lamp described in Example I, above, while Dry-Ice was added to the condenser to prevent loss of the trifluoroisobutylene. At the end of this time the temperature of the reaction mixture was 27–28° C. and all of the diazomethane had been used up. The ether was distilled off and the resulting colorless liquid obtained was 5-methyl-5-trifluoromethyl-2-pyrazoline, B. P. 140–141° C., $n_D^{20}=1.3876$.

A mixture of 3.6 g. of powdered potassium hydroxide and 2 g. of 10% platinized asbestos were placed in a 100 ml. 3-neck flask provided with a dropping funnel, thermometer and a condenser, the top of which was connected with a Dry-Ice cooled trap. The flask was heated to 170–190° C. and 15 g. of 5-methyl-5-trifluoromethyl-2-pyrazoline were added dropwise over a period of ½ to ¾ hour. Evolution of nitrogen was practically instantaneous. Towards the end of the reaction a slow stream of nitrogen was passed through the flask to drive over the last traces of the 1-trifluoromethyl-1-methyl-cyclopropane that had formed. Upon distillation, the compound had a B. P. of 38–39° C., $n_D^{20}=1.3228$.

The trifluoroisobutylene employed as the starting material was prepared in the following manner: A solution of 60 g. of 2-trifluoromethyl-2-hydroxy-propane and 60 g. of ethanol was placed in a 3-neck flask provided with a stirrer, thermometer and condenser. The top of the condenser was connected with a Dry-Ice cooled receiver. 70 ml. of concentrated sulphuric acid were slowly added and the flask was heated gradually over a period of 2 hours to 110° C., and then an additional 70 ml. of sulphuric acid were added and the temperature maintained at 120°–135° C. an additional ¾ hour. The trifluoroisobutylene which formed condensed in the receiver and was purified by bubbling it through aqueous sodium hydroxide. The compound had a B. P. of 6.4° C.

Example 3

1,1,1,4,4,4-Hexafluorobutene-2 (60 g.) was placed in a 3-neck flask provided with a condenser, thermometer and dropping funnel. A solution of about 0.3 mole of diazomethane in 500 ml. of ether was added. The color of the diazomethane disappeared slowly and the ether was distilled off whereupon 4,5-di(trifluoromethyl)-2-pyrazoline was obtained, B. P. 125–131° C., $n_D^{20}=1.3601$. The 4,5-di-(trifluoromethyl)-2-pyrazoline was decomposed in the same manner as the pyrazoline described in Example 2, except that double the amounts of potassium hydroxide and platinized asbestos were employed. After distillation, the 1,2-di(trifluoromethyl)-cyclopropane had a B. P. of 37–38° C.

Example 4

30 g. of trifluoroisobutylene and 22 g. of diazoacetic ethyl ester were placed in a bomb and heated to 120–140° C. for 3 hours. The reaction product was distilled, yielding 1-trifluoromethyl-1-methyl-2(or 3) carbethoxycyclopropane, B. P. 58° C. at 5 mm.

In the following embodiment of the invention trifluoromethylcyclopropane, as well as intermediates in the production thereof, are produced by brominating ethyl 4,4,4-trifluoro-3-hydroxy-butanoate to form ethyl 4,4,4-trifluoro-3-bromo-butanoate, reducing the latter to form 3-bromo-4,4,4-trifluorobutanol-1, brominating the last mentioned compound to produce 1,1,1-trifluoro-2,4-dibromobutane, and debrominating the latter to form trifluoromethylcyclopropane. The reactions involved can be represented by the following schematic equations:

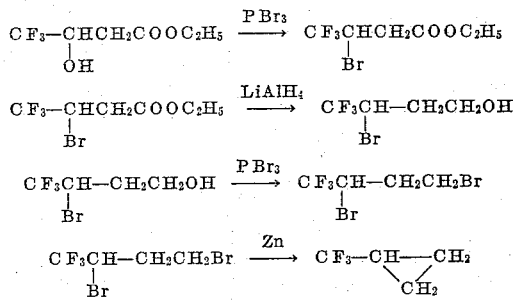

The following example illustrates the production of trifluoromethylcyclopropane:

A mixture of 62 g. of ethyl 4,4,4-trifluoro-3-hydroxy butanoate and 90 g. of phosphorus tribromide was placed in a 200 ml., 3-neck flask which was connected to a stirrer, a dropping funnel and a reflux condenser. The mixture was stirred and heated slowly to 100° C. whereupon the two liquids became miscible and hydrogen bromide was evolved through the condenser. The temperature was maintained at 120 to 130° C. for two hours at which time the evolution of gas had ceased. The reaction mixture was cooled and poured slowly into 200 ml. of ice-water. A viscous layer formed at the bottom of the solution and was separated. The water layer was extracted twice with 50 ml. of carbon tetrachloride. The combined carbon tetrachloride layers and the main fraction were washed dropwise with water and then dried over anhydrous MgSO₄. The carbon tetrachloride was removed at atmospheric pressure and the residue distilled at reduced pressure to yield 40 g. of a sweet smelling liquid, B. P. 66° C./17 mm., $n_D^{20}=1.3947$, comprising ethyl 4,4,4-trifluoro-3-bromo-butanoate.

70 g. of the above product were added dropwise over a period of 1 hour to a 3-neck 1-litre flask connected to a stirrer, dropping funnel and condenser containing a solution of 5.8 g. of lithium aluminum hydride and 500 ml. of anhydrous ether. During this time the flask was cooled in an ice bath. The mixture was hydrolized with 6 N sulphuric acid and the ether layer separated and dried over MgSO₄. The ether was removed at 35° C. and the residue distilled under reduced pressure. The distillation yielded two distinct fractions; the first, 6 g., contained no bromine and gave an analysis for 4,4,4-trifluorobutanol-1, B. P. 57–58° C./33 mm., $n_D^{20}=1.3516$; the second, 25 g., comprised 3-bromo-4,4,4-trifluorobutanol-1, B. P. 80–81° C./33 mm., $n_D^{20}=1.4040$.

60 g. of 3-bromo-4,4,4-trifluorobutanol-1 were mixed slowly in a 200 ml., 3-neck flask with 80 g. of phosphorus tribromide. Hydrogen bromide was immediately evolved with an accompanying rise of temperature of 45° C. resulting from the exothermic reaction. The mixture was heated at 50° C. for 1 hour, then cooled and poured into 300 ml. of ice-water. The viscous layer which formed at the bottom of the flask was separated and the water layer was extracted with carbon tetrachloride. The viscous liquid and the carbon tetrachloride were combined and washed with water and dried over MgSO₄. The carbon tetrachloride was removed at 76° C. and the residue distilled under reduced pressure to yield 20 g. of 1,1,1-trifluoro-2,4-dibromobutane, B. P. 55–56° C./27 mm., $n_D^{20}=1.4349$.

A 300 ml. 3-neck flask was fitted with a stirrer, dropping funnel and a condenser from which the exit gases could be bubbled through water and collected in a Dry-Ice alcohol trap. 10 g. of zinc dust, 8 g. of sodium carbonate, 4 g. of potassium iodide and 40 g. of acetamide were placed in the flask. The contents were heated to 120° C. and 20 g. of 1,1,1-trifluoro-2,4-dibromobutane were added dropwise while the mixture was heated. Because of the slow generation of gas, at this temperature, it was then raised to 140° C. and maintained at 140–145° C. for 1 hour at which time the evolution of gas had ceased. Heating the mixture at 155° C. failed to generate more gas. After cooling the flask, a colorless liquid comprising trifluoromethylcyclopropane was obtained in a Dry-Ice trap.

We claim:

1. Trifluoromethylcyclopropanes represented by the formula:

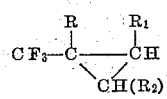

wherein R is a member of the group consisting of hydrogen and lower alkyl, R₁ is a radical selected from the group consisting of hydrogen and trifluoromethyl, and R₂ is a radical selected from the group consisting of hydrogen and lower alkyl carbalkoxy.

2. Trifluoromethylcyclopropane.
3. 1-trifluoromethyl-1-lower alkyl-cyclopropane.
4. 1-trifluoromethyl-1-lower alkyl-2-lower alkyl carbalkoxycyclopropane.
5. 1-trifluoromethyl-1-methyl-cyclopropane.
6. 1-trifluoromethyl-1-methyl-2-carbethoxycyclopropane.

7. 1,2-di(trifluoromethyl)cyclopropane.

8. In the production of trifluoromethyl cyclopropanes, the process which comprises reacting a trifluoromethylolefine with a diazo compound selected from the group consisting of diazomethane and diazoacetic acid alkyl ester.

9. A process in accordance with claim 8, wherein diazomethane is employed.

10. A process in accordance with claim 9, wherein the trifluoromethylpyrazoline formed is decomposed to produce the trifluoromethyl cyclopropane compound.

11. A process which comprises reacting diazomethane and trifluoropropylene by subjecting the reactants to ultraviolet irradiation and heating the 5-trifluoromethyl-2-pyrazoline formed to produce trifluoromethylcyclopropane.

12. A process which comprises reacting diazomethane and trifluoroisobutylene by subjecting the reactants to ultra-violet irradiation and heating the 5-methyl-5-trifluoromethyl-2-pyrazoline formed to produce 1-trifluoromethyl-1-methyl-cyclopropane.

13. A process which comprises reacting diazomethane with 1,1,1,4,4,4,-hexafluorobutene and heating the 4,5-di(trifluoromethyl)-2-pyrazoline formed to produce 1,2-di(trifluoromethyl)cyclopropane.

14. A process which comprises heating 4,5-di(trifluoromethyl)-2-pyrazoline to produce 1,2-di(trifluoromethyl)-cyclopropane.

15. A process which comprises heating 5-trifluoromethyl-2-pyrazoline to produce trifluoromethylcyclopropropane.

16. A process which comprises heating 5-methyl-5-trifluoromethyl-2-pyrazoline to produce 1-trifluoromethyl-1-methyl-cyclopropane.

17. 5-lower alkyl-5-trifluoromethyl-2-pyrazoline.

18. 5-methyl-5-trifluoromethyl-2-pyrazoline.

19. 5-trifluoromethyl-2-pyrazoline.

20. 4,5-di(trifluoromethyl)-2-pyrazoline.

References Cited in the file of this patent

UNITED STATES PATENTS

| | | |
|---|---|---|
| 2,061,519 | Nelson et al. | Nov. 17, 1936 |
| 2,384,449 | Benning | Sept. 11, 1945 |
| 2,384,821 | Downing et al. | Sept. 18, 1945 |
| 2,441,595 | Rapoport | May 18, 1948 |
| 2,449,360 | Austin | Sept. 14, 1948 |
| 2,451,843 | Linn et al. | Oct. 19, 1948 |
| 2,515,160 | Copenhaver | July 11, 1950 |
| 2,515,306 | Ladd et al. | July 18, 1950 |
| 2,567,011 | Diesslin et al. | Sept. 11, 1951 |
| 2,636,039 | Druey | Apr. 21, 1953 |